(12) United States Patent
Heinrich (10) Patent No.: US 9,797,996 B2
(45) Date of Patent: Oct. 24, 2017

(54) DISTANCE-MEASURING-DEVICE

(71) Applicant: DELPHI INTERNATIONAL OPERATIONS LUXEMBOURG S.A.R.L., Bascharage (LU)

(72) Inventor: Markus Heinrich, Nuembrecht (DE)

(73) Assignee: DELPHI INTERNATIONAL OPERATIONS LUXEMBOURG S.A.R.L., Luxembourg (LU)

( * ) Notice: Subject to any disclaimer, the term of this patent is extended or adjusted under 35 U.S.C. 154(b) by 342 days.

(21) Appl. No.: 14/735,418

(22) Filed: Jun. 10, 2015

(65) Prior Publication Data

US 2015/0362586 A1 Dec. 17, 2015

(30) Foreign Application Priority Data

Jun. 12, 2014 (EP) .................................... 14172114

(51) Int. Cl.
| | |
|---|---|
| *G01S 7/486* | (2006.01) |
| *G01S 17/08* | (2006.01) |
| *G01S 17/10* | (2006.01) |
| *G01S 7/484* | (2006.01) |
| *G01S 7/497* | (2006.01) |

(52) U.S. Cl.
CPC ............ *G01S 7/4865* (2013.01); *G01S 7/484* (2013.01); *G01S 7/497* (2013.01); *G01S 17/08* (2013.01); *G01S 17/10* (2013.01)

(58) Field of Classification Search
CPC .......... G01S 17/08; G01S 7/497; G01S 7/484; G01S 17/10; G01S 7/4865
See application file for complete search history.

(56) References Cited

U.S. PATENT DOCUMENTS

| | | |
|---|---|---|
| 5,291,262 A | 3/1994 | Dunne |
| 2010/0231891 A1 | 9/2010 | Mase et al. |
| 2012/0194798 A1 | 8/2012 | Crawford et al. |

(Continued)

FOREIGN PATENT DOCUMENTS

| | | | | |
|---|---|---|---|---|
| CN | 105277943 A | * 1/2016 | ............. | G01S 17/08 |
| LU | EP 2955539 A1 | * 12/2015 | ............. | G01S 17/08 |

OTHER PUBLICATIONS

Nissinen, J., et al.: "Integrated Receiver Including Both Receiver Channel and TDC for a Pulsed Time-of-Flight Laser Rangefinder With cm-Level Accuracy", IEEE Journal of Solid-State Circuits, IEEE Service Center, Piscataway, NJ, USA, vol. 44, No. 5, May 1, 2009 (May 1, 2009), pp. 1486-1497, XPO11256786, ISSN: 0018-9200, DOI: 10.1109/JSSC.2009.2017006.

*Primary Examiner* — Daniel Pihulic
(74) *Attorney, Agent, or Firm* — Lawrence D. Hazelton (57) ABSTRACT

An apparatus and method for determining the distance from a distance-measuring-device to an object by sending a light-pulse from a light-emitting component toward the object by passing a current pulse through the component. A value based on the current or voltage across the component is used to determine the reference-time T0 when the value exceeds a first threshold-value, and determines first-time T1 when the value is reduced to a second threshold-value THL2. T1 is used to define two time-windows when intensity of reflected light is integrated to provide two values (Q1/Q3 and Q2/Q4) to determine a time of flight for the light-pulse based on the two values (Q1/Q3 and Q2/Q4), the difference between T0 and T1 (T1-T0), and the speed of light, c.

27 Claims, 4 Drawing Sheets (56) References Cited

U.S. PATENT DOCUMENTS

2012/0312966 A1   12/2012  Suzuki et al.
2015/0362586 A1*  12/2015  Heinrich ................ G01S 17/08
                                                 356/5.01

* cited by examiner

DISTANCE-MEASURING-DEVICE

CROSS-REFERENCE TO RELATED APPLICATION

This application claims the benefit under 35 U.S.C. §119(a) of European Patent Application EP 14172114.2, filed 12 Jun. 2014, the entire disclosure of which is hereby incorporated herein by reference.

TECHNICAL FIELD OF INVENTION

This disclosure relates to a distance-measuring-device determining a distance of an object from the distance-measuring-device and its associated method for doing the same.

BACKGROUND OF INVENTION

One method of distance-measuring-devices is the measurement of the distance to an object by determining the time of flight of a light pulse. It is known in the art to provide distance-measuring-devices which send a precisely timed light pulse toward an object and to make gated measurements of the light reflected thereby. The time of flight of the light pulse is simply related to the range of the object through the relation $d = c * \Delta td / 2$, where d is the distance to the object, c stands for the velocity of light in the medium through which it propagates and $\Delta td$ is the time delay between the pulse emission and its detection.

Several distance-measuring-devices that include time-gated detection schemes are known in the art. As a well-known solution, a distance-measuring-device sends a light pulse toward an object and records the reflected light from the object by a light sensor (typically which converts the incident light to voltage/current) using two gated time-intervals equal of time. The light pulse emitted from a light source is typically driven by a pulse generator providing a digital pulse. A first gated time-interval is typically synchronized with the digital pulse such that it starts at the same time the digital pulse starts and another gated time-interval starting at the end of the digital pulse. The durations of both gated time-intervals are generally set to be equal to the length of the digital pulse. The range of the object is in one type of method is determined by the ratio between the amount of reflected light received during the first gated time-interval and the sum of the two amounts of reflected light received respectively during the first gated time-interval and the second gated time-interval.

The existing distance-measuring-devices are not accurate enough for security applications such as safety functions of automotive applications. Synchronization of digital pulses generates error. Furthermore the pulse length variation and delays are introduced which vary with environmental parameters such as supply voltage, temperature, or variation in electronic component parameters which drift from their nominal values. Solutions such as a calibration table stored in a memory of a distance-measuring-device exist. However, those solutions do not fully compensate the existing variations. Those solutions cost time, effort, and money for implementation.

SUMMARY OF THE INVENTION

It is an object of the invention to provide an improved distance-measuring-device and associated method for doing the same in order to overcome such problems. It is an object of the invention to determine accurately the distance of an object by determining accurately the length of an emitted light pulse and its starting time.

In one aspect is provided a method for determining the distance d from a unit to an object that includes sending a pulse of light from a light-emitting component to the object by passing a current pulse I1 sent through the component. The method also includes measuring the current I1 through or voltage across the light-emitting component and determining a reference-time T0 when the value exceeds or is equal to a pre-determined first threshold-value THL1. The method also includes determining the first-time T1 when the value is reduced to a pre-determined second threshold-value THL2. The method also includes using the time first-time T1 to define two time-windows. The method also includes receiving a reflected pulse of light from the object at the unit by a light sensor. The method also includes integrating a measure of the intensity of reflected light in the light sensor during the two time-windows to provide two values (Q1/Q3 and Q2/Q4). The method also includes determining the time of flight from the values), the difference between T0 and T1 (T1−T0) and the speed of light, c.

In a preferred embodiment, a method for determining the distance d from a unit to an object may include a step of sending a pulse of light from a light-emitting component to the object by means of passing a current pulse I1 sent through the component; a step of measuring the current I1 through or voltage across the light-emitting component and determining the reference-time T0 when the value exceeds a pre-determined first threshold-value THL1 and determining the first-time T1 when the value is reduced to a pre-determined second threshold-value THL2; a step of receiving a reflected pulse of light from the object at the unit by a light sensor; a step of integrating a measure of the intensity of reflected light in the light sensor between time T0 and T1 to provide a value Q1; a step of integrating a measure of the intensity of reflected light in the light sensor between time T1 and T2, where T2 is the time-interval equal to T0+(2*(T1−T0)), to provide a value Q2; a step of determining the distance d from the formula $d = \frac{1}{2} * c * (T1 - T0) * (Q1/(Q1+Q2))$.

In another preferred embodiment a method for determining a distance d from a unit to an object may include a step of sending a pulse of light from a light-emitting component to the object by means of passing a current pulse I1 sent through the component; a step of measuring the current I1 through or voltage across the light-emitting component and determining the reference-time T0 when the value exceeds a pre-determined first threshold-value THL1 and determining the first-time T1 when the value is reduced to a pre-determined second threshold-value THL2; a step of receiving a reflected pulse of light from the object at the unit by a light sensor; a step of measuring the current Ipd through or voltage across the light sensor and determining the point TA when the value exceeds a pre-determined third threshold-value THL3 and determining the point TB when the value is reduced to a pre-determined fourth threshold-value THL4; a step of integrating a measure of the intensity of reflected light in the light sensor between time TA and T1 to provide a value Q3; a step of integrating a measure of the intensity of reflected light in the light sensor between time T1 and TB to provide a value Q4; a step of determining the distance d from the formula $d = \frac{1}{2} * c * (T1 - T0) * (Q3/(Q3+Q4))$.

The measure of the intensity of reflected light may be current Ipd through the light sensor.

The value of (T1−T0) may be determined by charging a first capacitor of value C1 by a constant current Ic between times T0 and T1 to a voltage value VC1 and where T1−T0= (VC1*C1)/Ic.

The thresholds THL1 and THL2 may be equal.

In another embodiment, an apparatus for determining the distance d from a unit to an object is provided. The apparatus includes a means to send a pulse of light from a light-emitting component to the object by passing a current pulse I1 through the component; means to measure the current I1 through or voltage across the light-emitting component and to determine the reference-time T0 when the value exceeds a pre-determined first threshold-value THL1 and determining the first-time T1 when the value is reduced to a pre-determined second threshold-value THL2; a means to using the time first-time T1 to define two time-windows; means to receive a reflected pulse of light from the object at the unit by a light sensor; a means to integrate a measure of the intensity of reflected light in the light sensor during the two time-windows to provide two values (Q1/Q3 and Q2/Q4); means to determine the time of flight from the two values (Q1/Q3 and Q2/Q4), the difference between T0 and T1 (T1−T0) and the speed of light, c.

In another preferred embodiment an apparatus for determining the distance from the unit to an object may further include means for sending a pulse of light from a light-emitting component to the object by means of passing a current pulse I1 sent through the component; means for measuring the current I1 through or voltage across the light-emitting component; means for determining the reference-time T0 when the values of the current I1 exceeds a pre-determined first threshold-value THL1 and means for determining the first-time T1 when the value is reduced to a pre-determined second threshold-value THL2; means for determining the point T2 where T2 is the time-interval equal to T0+(2*(T1−T0)); means for receiving a reflected pulse; means for integrating a measure of the intensity of reflected light in the light sensor between time T0 and T1 to provide a value Q1 and for integrating a measure of the intensity of reflected light in the light sensor between time T1 and T2, where T2 is the time-interval equal to T0+(2*(T1−T0)), to provide a value Q2; means for determining the distance d from the formula: d=½ *c*(T1−T0)*(Q1/(Q1+Q2)).

In another preferred embodiment an apparatus for determining the distance d from the unit to an object may further include means for sending a pulse of light from a light-emitting component to the object by means of passing a current pulse I1 sent through the component; means for measuring the current I1 through or voltage across the light-emitting component and determining the reference-time T0 when the values of the current I1 exceeds a pre-determined first threshold-value THL1 and means for determining the first-time T1 when the value is reduced to a pre-determined second threshold-value THL2; light sensor means for receiving the reflected pulse of light from the object; means for measuring the current Ipd through or voltage across the light sensor means and means for determining the point TA when the values of the current Ipd through the light sensor exceeds a pre-determined third threshold-value THL3 and means for determining the point TB when the values of the current is reduced to a pre-determined fourth threshold-value THL4; means for integrating a measure of the intensity of reflected light in the light sensor between time TA and T1 to provide a value Q3 and means for integrating a measure of the intensity of reflected light in the light sensor between time T1 and TB; means for determining the distance from the formula:

$$d=\tfrac{1}{2}*c*(T1-T0)*(Q3/(Q3+Q4)).$$

The thresholds THL1 and THL2 may be equal.

The means of measuring the intensity of reflected light may comprise means to measure current Ipd through the light sensor.

The means of determining the value of (T1−T0) may comprise a first capacitor of value C1 charged by a constant current Ic between times T0 and T1 to a voltage value VC1 such that T1−T0=(VC1*C1)/Ic.

The means for determining the reference-time T0 and for determining the first-time T1 may comprise a voltage comparator having an adjustable threshold voltage input.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Prior Art

Figure 1:
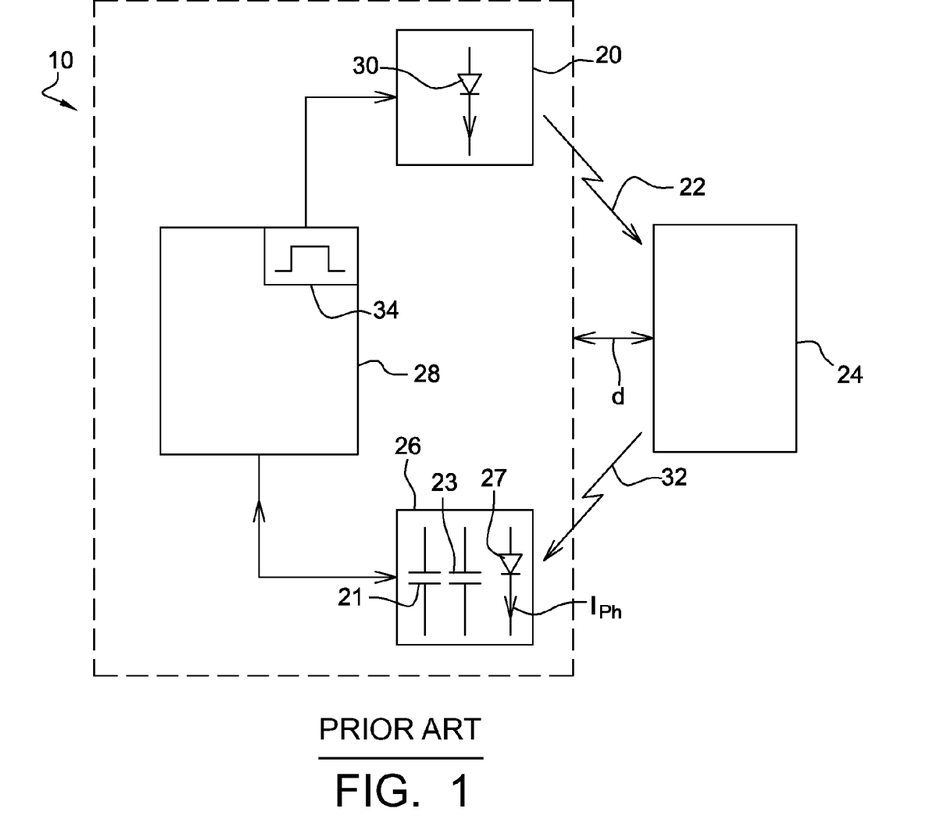
FIG. 1 shows a block diagram of a prior art distance-measuring-device in accordance with one embodiment.

FIG. 1 is a block diagram of a prior art distance-measuring-device 10. The device 10 determines a distance d from an object 24 from the device 10. The device 10 includes a light driver 20 having an optical diode 30 such as a laser diode able to generate an light pulse 22, towards the object 24 whose distance d is to be measured, and a controller 28 having a connection with the light driver 20 for providing control of the light driver 20 by way of a digital pulse. The device 10 further includes a light sensor 26, connected to the controller 28, able to detect a received light pulse 32 generated by the reflection of the emitted light pulse 22 by the object 24, and converts into a current/voltage pulse.

A signal generator 34 which is located in the controller 28 and managed by the controller 28, controls generation of the digital pulse that is sent to the light driver 20 so that the length ΔTd of the digital pulse sent to the emitter is known by the controller 28.

The light sensor 26 includes a photosensitive element 27 such as a photo diode which produces an electrical current Iph as a function of (intensity of) the reflected light-pulse 32 and a current integrator which is connected to the photosensitive element 27 and converts the current Iph to an electrical charge. The output of the charge integrator is connected to the controller 28 via multiplexer internal of the photosensitive element. The light sensor can further includes a first and a second capacitors 21, 23 which terminals are the integrator's output. Functions of the light sensor 26 will be explained in details through the description of FIG. 2.

Figure 2:
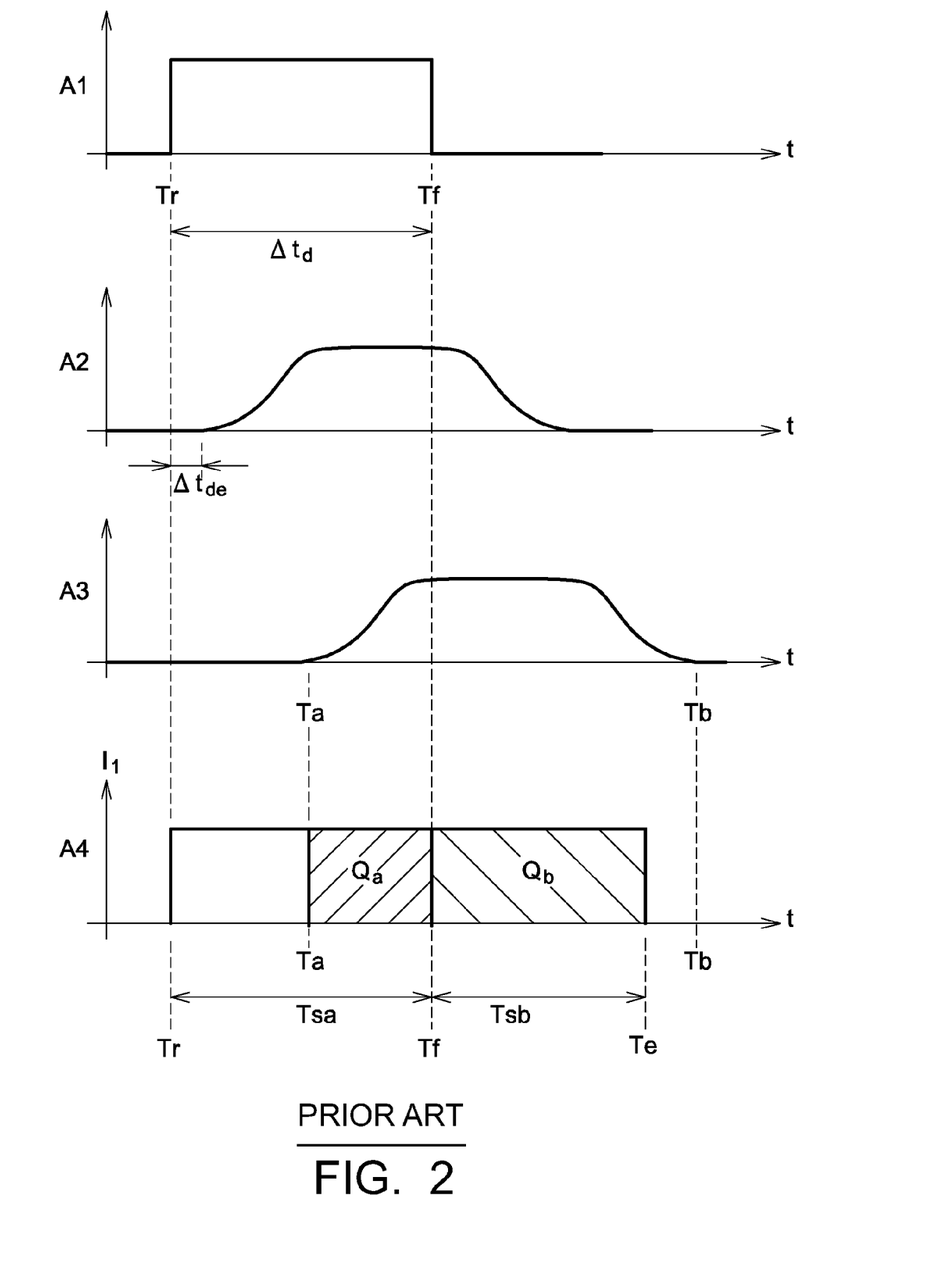
FIG. 2 shows timing charts of signals processed by the prior art distance-measuring-device in accordance with one embodiment.

FIG. 2 shows timing charts of signals processed by the prior art distance-measuring-device 10. A first timing chart A1 shows amplitude of the digital pulse that is sent to the light driver 20 by the signal generator 34 of the controller 28. It is characterized by its length ΔTd known by the controller 28 between its rising edge and its falling edge. The rising edge occurs at a first time Tr and the falling edge occurs at a second time Tf.

A second timing chart A2 shows the amplitude of emitted light pulse 22 according to the setting of the prior art distance-measuring-device 10. The controller 28 has no information about the emitted light pulse 22 as there is no feedback information from the light driver 20 to the controller 28. There is a time delay ΔTde between the emitted light pulse 22 and the digital pulse sent to the optical diode 30 illustrated by the first timing chart A1. The time delay ΔTde is partially due to inherent hardware characteristics of the light driver 20.

A third timing chart A3 shows the amplitude of light pulse 32 reflected by the object 24 and received by the light sensor 26. At a time Ta, the light sensor 26 starts to receive the reflected light-pulse 32. At a time Tb, the light sensor 26 ends to receive the reflected pulse 32.

A fourth timing chart A4 shows a first and a second time slots TSa, TSb. The 'Y' axis is a representation of the activation of the time slots (TSa, TSb). The first and the second time slots TSa, TSb are under the control of the controller 28, such that the light sensor 26 registers the current Iph through the light sensor 26 e.g. by integrating the current Iph during these time slots so as to get a measure of aggregate light falling on the light sensor 26 in these time slot periods. The duration of the first and the second time slot TSa, TSb is set equal to the length ΔTd of the digital pulse. The first time slot TSa starts at a time Tr the controller 28 initiates the digital pulse for the light sensor 26 and ends at a time Tf the controller 28 stops the digital pulse i.e. at the end of the digital pulse. The second time slot TSb starts at the time Tf and ends at a time Te such that the duration of the second time slot Tsb is equal of the duration of the first time slot TSa. The photosensitive element 27 starts to generate the current Iph at the time Ta and ends to generate it at the time Te i.e. the reflected light-pulse 32 starts to influence the photosensitive element 27 at the time Ta and stops at the time Tb.

The current Iph is integrated only during the first and a second adjacent time slots TSa, TSb of equal time that results respectively to a first and a second amount of electrical charges Qa, Qb.

The distance d to the object 24 can be calculated by using Eq. 1 where c stands for the velocity of light in the medium through which it propagates:

$$d=\tfrac{1}{2}*c*\Delta Td*(Qa/(Qa+Qb))\qquad\text{Eq. 1.}$$

As an example, the first capacitor 21 is connected with the photosensitive element 27 only during the first time slot TSa such that it charges by the current Ipd from the time Ta until the time Tf. The charge of the first capacitor 21 results in the first amount of electrical charge Qa stored on it. The second capacitor 23 is connected with the photosensitive element 27 only during the second time slot TSb such that it charges by the current Iph from the time Tf until the time Te. The charge of the second capacitor 23 results in the second amount of electrical charge Qb stored on it. From the controller 28 perspective, the first and the second amounts of electrical charges Qa, Qb can be acquired through the terminals of the first capacitor 21 and the second capacitor 23, in such a case the terminals constitute a first and a second integrator's output voltages value Va, Vb, those voltages output being simply dependent on the capacitors value. Considering that the first capacitor 21 and the second capacitor 23 have a same value, the distance d to the object 24 can be calculated by the controller 28 using the formula (2) where c stands for the velocity of light in the medium through which it propagates:

$$d=\tfrac{1}{2}*c*\Delta Td*(Va/(Va+Vb))\qquad\text{Eq. 2.}$$

To summarize, the prior art distance-measuring-device 10 uses digital parameters for the distance d determination as the length of the digital pulse and its starting time. These digital parameters do not accurately represent what is really emitted in the air, because of the temperature dependency of the hardware, of the length of the emitted light pulse and of the time delay ΔTde. Following description relative to the invention provides an example of an improved distance-measuring-device.

Example of the Invention

Figure 3:
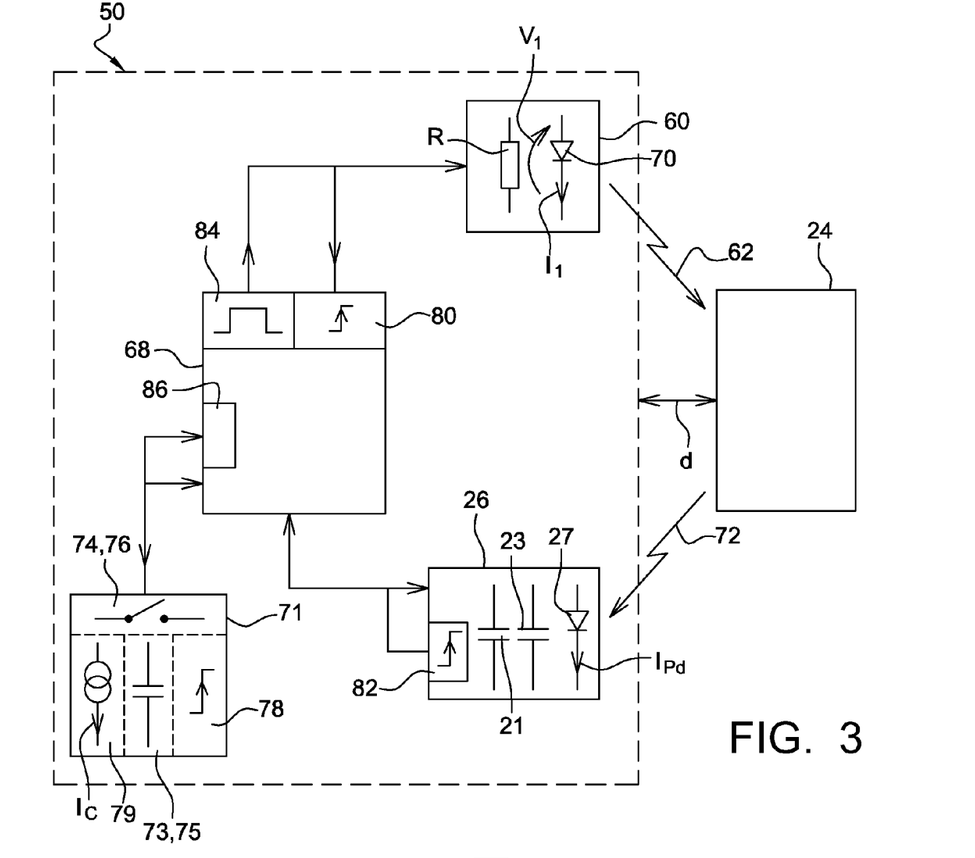
FIG. 3 shows a block diagram of a distance-measuring-device according to one example of the invention in accordance with one embodiment.

FIG. 3 is a block diagram example of a distance-measuring-device 50 according to one aspect of the invention. The distance-measuring-device 50 determines the distance d of the object 24 from the distance-measuring-device 50. The distance-measuring-device 50 includes light-emitting component 60 having another optical diode 70 such as another laser diode able to generate another emitted light-pulse 62 towards the object 24 whose distance d is to be measured, controller 68 having another connection with the light-emitting component 60 for providing it a digital pulse, and the light sensor 26, having its integrator output connected to the controller 68, able to detect another received light pulse 72 generated by the reflection of the other emitted light-pulse 62 by the object 24.

A signal generator 84 which is located in the controller 68 and managed by the controller 68, controls generation of the digital pulse that is sent to the light-emitting component 60. Alternatively, the signal generator 84 can be located externally to the controller 68. The controller 68 can be an integrated circuit such as a Field Programmable Gate Array (FPGA).

While receiving the digital pulse from the signal generator 84, the light-emitting component 60 biases its optical diode 70 for duration equal to the length of the digital pulse. A current I1 consequently flows through the optical diode 70 and thus the emitted light-pulse 62 emitted from the optical diode 70 is sent toward the object 24. The light-emitting component 60 informs the controller 68 on the level of the emitted light-pulse 62 by a wired connection such that the controller 68 is able to assess the level of the emitted light-pulse 62. In other words, as example, the current I1 flowing through the optical diode 70 flows through a resistor R connected in series with the optical diode 70, such that the voltage over the resistor R, which is proportional to the current I1, can be determined by the controller 68 via a wire connection.

Alternatively, the light sensor 26 may be used to detect the level of the emitted light-pulse 62.

The distance-measuring-device 50 further includes a first voltage comparator 80, which is located in the controller 68, having two inputs, one input being set to a reference level THL1 such as a first adjustable threshold voltage, the second input being connected to the light-emitting component 60 such that the level of the current I1 of the optical diode 70 can be compared with the first adjustable threshold voltage. The first voltage comparator 80 further includes an output that switches its logic state in function of the level of the current I1 compared with the first adjustable threshold voltage. In an example, in order to implement this, the current I1 flowing through the optical diode 70 flows through the resistor R connected in series with the optical diode 70, such that the voltage over the resistor R, which is proportional to the current I1, can be effectively compared with the first adjustable threshold voltage. The first voltage comparator 80 can thus provide to the controller the information on the presence of the rising edge of the emitted light-pulse 62 if the current I1 provides a voltage over the resistor R exceeding the first adjustable threshold voltage value THL1 during the rising edge of the emitted light-pulse 62. The first voltage comparator 80 can further provide to the controller the information on the falling edge of the emitted light-pulse 62 if the current I1 provides a voltage over the resistor R smaller than the first adjustable threshold voltage value THL1 during the falling edge of the emitted light-pulse 62.

Alternatively, the first voltage comparator 80 can be located externally to the controller 68, as a stand-alone first voltage comparator 80, or integrated in a device as in the light-emitting component 60.

Alternatively, the distance-measuring-device 50 can comprise other methods so the first voltage comparator 80 can monitor the level of the emitted light-pulse 62. The level of the emitted light-pulse 62 can be compared to another reference THL1 than a threshold voltage by other means than the first voltage comparator 80. Well known solution can be for instance the usage of a current comparator using current mirrors.

The light sensor 26 includes the photosensitive element 27 such as a photo diode which produces an electrical current Ipd as a function of the reflected light-pulse 72 and a current integrator which is connected to the photosensitive element 27 and converts (e.g. sums/integrates) the current Ipd to an electrical charge. The output of the charge integrator is connected to the controller 68. Functions of the light sensor 26 will be explained in details through the description of FIG. 5.

As an option, the light sensor 26 is further comprises a second voltage comparator 82 capable of comparing the intensity of the reflected light-pulse 72 with a second reference level. The intensity may dictate the current Ipd through the photosensitive element 27. In an example the voltage across the photosensitive element 27 is proportion to the generated current Ipd and thus provides a voltage to be compared with a second adjustable threshold voltage, the output of the second voltage comparator 82 being connected with the controller 68. As example, the second voltage comparator 82 can provide to the controller 68 the information on the presence of the rising edge of the reflected light-pulse 72 when the level of the reflected light-pulse 72 exceeds the second adjustable threshold voltage value THL2. The second voltage comparator 82 can further provide to the controller 68 the information on the falling edge of the reflected light-pulse 72 when the level of the reflected light-pulse 72 is smaller than the second adjustable threshold voltage value THL2. Alternatively, the second voltage comparator 82 can be located externally to the light sensor 26, as a stand-alone second voltage comparator, or integrated in a device as in the controller 68.

Functions of the option of the light sensor 26 will be explained in detail later with reference to FIG. 5.

Alternatives can be provided; a point to note is that effectively a threshold of intensity is determined to recognize the start of the received reflected light-pulse. So alternatively the current through the light sensor may be compared with relevant thresholds. Alternatively, the distance-measuring-device 50 can comprise other solution than the second voltage comparator 82 to monitor the level of the reflected light-pulse 72. The level of the reflected light-pulse 72 can be compared to another reference level than a threshold voltage by other means than the second voltage comparator 82. Well-known solution can be for instance the usage of a current comparator using current mirrors.

The distance-measuring-device 50 further includes an analog Dual Slope Time to Digital Converter 71 (DSTDC). The DSTDC 71, including a first capacitor 73, a second capacitor 75, a first switch 74, and a second switch 76, controlled by the controller 68, a current source 79 and a third voltage comparator 78, communicates with the controller 68 and provides the charging level of at least one of the first capacitor 73 and the second capacitor 75 to the controller 68 via an Analog to Digital Converter 86. Details are explained in more detail hereafter.

Figure 4:
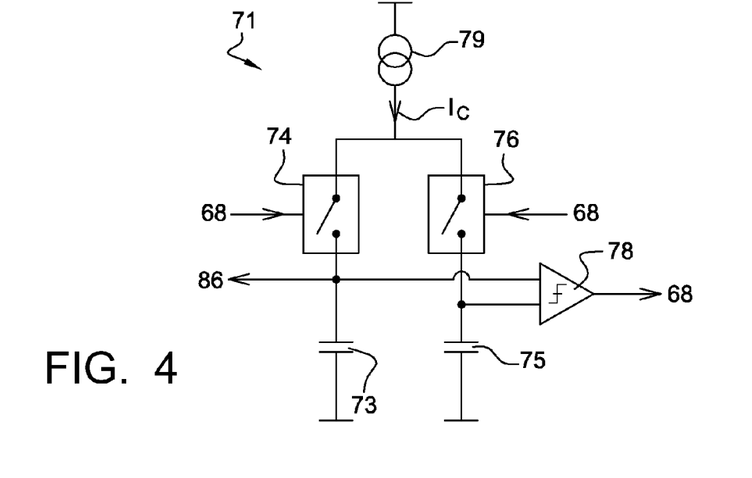
FIG. 4 shows a simplified schematic diagram of a Dual Slope Time to Digital Converter according to one example of the invention in accordance with one embodiment.

FIG. 4 shows an example of a simplified schematic diagram of the Dual Slope Time to Digital Converter 71. The constant current Ic from current source 79 is provided to two paths. Each path includes one of the two electronic switches 74, 76, controlled by the controller 68 connecting the current source to one of the first capacitor 73 and the second capacitor 75. Each of the first capacitor 73 and the second capacitor 75 is connected to one of the two inputs of the third voltage comparator 78 such that the charge level of the first capacitor 73 can be compared to the charge level of the second capacitor 75. The output of the third voltage comparator 78 is connected to the controller 68. The first capacitor 73 is connected to the Analog to Digital Converter 86 located in the controller 68. The Analog to Digital Converter 86 is able to provide a voltage value of the first capacitor 73 to the controller 68. Alternatively, the Analog to Digital converter 86 can be located externally to the controller 68 as a stand-alone Analog to Digital Converter or integrated in the DSTDC 71.

Methodology

Example Method 1

Figure 5:
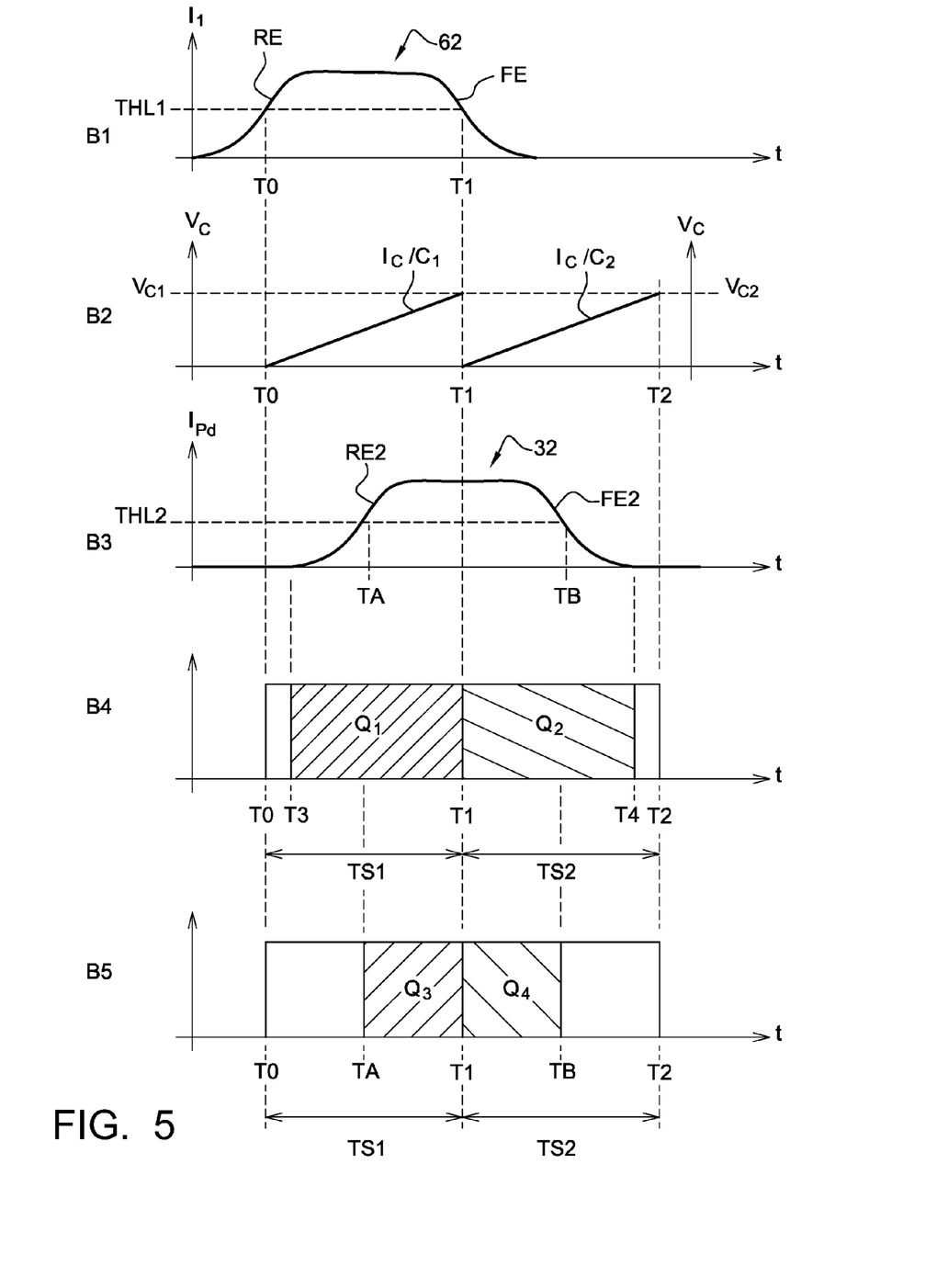
FIG. 5 shows timing charts of signals processed by the distance-measuring-device according to one example of the invention.

FIG. 5 shows an example of timing charts of signals processed by the distance-measuring-device 50 according to one implementation of the methodology.

A first timing chart B1 shows the characteristics of the emitted light-pulse 62 and specifically shows the current I1 flowing through the optical diode 70 during the emission of the emitted light-pulse 62. The form of the current I1 includes a smooth rising edge RE and a smooth falling edge FE. The smooth rising edge RE corresponds to the transient during activation of the gate driver of the light-emitting component 60, excited by the sharp rising edge of the digital pulse generated by the signal generator 84. The smooth falling edge FE corresponds to the transient during deactivation of the gate driver of the light-emitting component 60 excited by the sharp falling edge of the digital pulse generated by the signal generator 84.

A reference time T0 is shown when the level of the current I1 of the optical diode 70 exceeds a first level, e.g. when the current I1 produces a voltage that exceeds a first adjustable threshold voltage THL1. A time T1 is shown when the level of the current I1 becomes smaller than the first adjustable threshold THL1. The controller 68 is informed by the state of the output of the first voltage comparator 80 of the reference time T0 and T1. As example, the first adjustable threshold voltage THL1 can be adjusted at a threshold-value permitting the detection of the height of the emitted light-pulse 62 having amplitude greater than the amplitude of the ambient light of the medium through which it propagates.

A second timing chart B2 shows the voltage Vc of the first capacitor 73 and the second capacitor 75 of the DSTDC 71 during charging of the first capacitor 73 and the second capacitor 75 by the constant current Ic. At the reference time T0, when the controller 68 is informed by the first voltage comparator 80 that the level of the current I1 exceeds the first adjustable threshold THL1, the controller 68 activates the closure of the first switch 74 of the DSTDC 71 enabling the charge of the first capacitor 73 by the constant current Ic.

At the time T1, the controller 68 activates the opening of first switch 74 of the Dual Slope Time to Digital Converter 71 stopping the charging of the first capacitor 73 by the constant current Ic. During the first time-interval [T0-T1], the first capacitor 73 is charged by the constant current Ic of the current source 79. As the Analog to Digital Converter 86 is able to provide the first voltage valueVC1 of the first capacitor 73 to the controller 68, the controller is then able to accurately calculate the duration ΔT1 of the first time-interval [T0–T1] by Eq. 3:

$$\Delta T1 = (VC1 * C1)/Ic = T1 - T0. \quad \text{Eq. 3.}$$

The time duration ΔT1 of the first time-interval [T0, T1] is considered as an accurate value of the length of the emitted light-pulse 62.

Alternatively, the length of the emitted light-pulse 62 determined from the charge of the first capacitor 71 performs between two events defined as the level of current I1 exceeding a first reference level THL1 and the level of the current I1 becoming smaller than the first reference level THL1. Thus could be determined by a counter based digital based Time-to-Digital converter. In such alternative, the length of the emitted light pulse would have been determined by a cumulative quantifiable number of digital clock cycles between the two identified events.

To summarize the above steps determine accurately the length ΔT1 of the emitted light-pulse 62 by the following steps. At the time T1, when the level of the current I1 through the optical diode 70, effectively measured by the voltage across it becomes smaller than the first reference level THL1, the controller 68 activates the closure of the second switch 76 of the DSTDC 71 enabling the charging of the second capacitor 75 by the constant current Ic. When the third voltage comparator 78 detects that the voltage value of the second capacitor 75 charged by the constant current Ic exceeds the voltage value VC1 stored on the first capacitor 73, the logic state of the output of the third voltage comparator 78 switches from its previous logic state to the logic state so that the controller 68 identifies a time T2 as illustrated. At the time T2, the controller 68 activates the opening of the second switch 76 of the DSTDC 71 stopping the charge of the second capacitor 75 by the constant current Ic.

Additionally, during the second time-interval [T1–T2], the second capacitor 75 charged by the constant current Ic of the current source 79, is accumulating electrical charges that provides a second value Qn of the cumulative metric as a second voltage value VC2 so that the voltage value VC2 stored on the second capacitor 75 is considered as equal to the voltage value VC1 stored on the first capacitor 73. The duration ΔT2 of the second time-interval [T1–T2] can be determined by Eq. 4:

$$\Delta T2 = (VC2 * C2)/Ic \quad \text{Eq. 4.}$$

In one example of the present invention, the value C2 of the second capacitor 75 being equal to the value C1 of the first capacitor 73 and the voltage value VC2 across the second capacitor 75 being considered as equal to the voltage value VC1 stored on the first capacitor 73, the duration ΔT2 of the second time-interval [T1-T2] becomes equal to the duration ΔT1 of the first time-interval [T0-T1].

A third timing chart B3 shows the characteristics of the reflected light-pulse 72 and specifically shows the current Ipd provided through the light sensor 26 during the reception of the reflected light-pulse 72. The form of the current Ipd includes a smooth rising edge RE2 and a smooth falling edge FE2.

At a time TA, the level of the current Ipd through the light sensor 26 exceeds a second level, e.g. when the current Ipd produces a voltage that exceeds a second adjustable threshold voltage THL2.

A time TB is shown when the level of the current Ipd of the light sensor 26 becomes smaller than the second adjustable threshold voltage THL2. The controller 68 is informed by the second voltage comparator 82 of when voltage produced by the current exceeds the second threshold voltage THL2 such that the controller 68 is able to identify the time TA and TB. At a time T3, the light sensor 26 starts to receive the reflected light-pulse 72. At a time T4, the light sensor 26 ends to receive the reflected light-pulse 72.

A fourth timing chart B4 shows a first and a second time slots TS1 and TS2. The 'Y' axis is a representation of the activation of the time slots (TS1, TS2). The first and the second time slots TS1, TS2 are under the control of the controller 28, such that the light sensor 26 is effectively enable by the controller 28 only during the time slots TS1, TS2 to register the current Ipd through the light sensor 26 e.g. by integrating the current Ipd during these time slots TS1, TS2 so as to get a measure of aggregate light falling on the light sensor 26 in these time slot periods. The duration of the first time slot TS1 is equal to the duration ΔT1 of the first time-interval [T0–T1]. The duration of the second time slot TS2 is equal to the duration ΔT2 of the second time-interval [T1–T2]. As stated above, both time-intervals duration are equal to the length of the emitted light-pulse 62. The first time slot TS1 starts at the reference time T0. The second time slot TS2 starts at the time T1. The photosensitive element 27 starts to generate the current Ipd at the time T3 and ends to generate the current Ipd at the time T4, i.e. the reflected light-pulse 72 starts to influence the photosensitive element 27 at the time T3 and stops at the time T4.

The current Ipd is integrated during the first and a second adjacent time slots TS1, TS2 of equal time that results respectively to a first and a second amount of electrical charges Q1, Q2.

The distance d to the object 24 can be calculated by using Eq. 5 where c stands for the velocity of light in the medium through which it propagates:

$$d = \tfrac{1}{2} * c * \Delta T1 * (Q1/(Q1+Q2)). \quad \text{Eq. 5.}$$

As an example, the first capacitor 21 is connected with the photosensitive element 27 only during the first time slot TS1 such that it charges by the current Ipd from the time T3 until the time T1. The charge of the first capacitor 21 results in the first amount of electrical charge Q1 stored on it. The second capacitor 23 is connected with the photosensitive element 27 only during the second time slot TS2 such that it charges by the current Ipd from the time T1 until the time T4. The charge of the second capacitor 23 results in the second amount of electrical charge Q2 stored on it. From the controller 68 perspective, the first and the second amounts of electrical charges Q1, Q2 can be acquired through the terminals of the first capacitor 21 and the second capacitor 23, in such a case the terminals constitute a first and a second integrator's output voltages value V1, V2, those voltages output being simply dependent on the value of the first capacitor 21 and the second capacitor 23. Considering that the first capacitor 21 and the second capacitor 23 have a same value, the distance d to the object 24 can be calculated by the controller 28 using Eq. 6 where c stands for the velocity of light in the medium through which it propagates:

$$d = \tfrac{1}{2} * c * \Delta T1 * (V1/(V1+V2))$$ Eq. 6.

Example Method 2

A fifth timing chart B5 shows an alternative method. The 'Y' axis is a representation of the activation of the time slots (TS1, TS2). The method integrates the current Ipd starting at the time TA that depends on the point the second adjustable threshold voltage THL2 is achieved and ends at the time TB. The photosensitive element 27 starts to generate the current Ipd at the time TA and ends to generate the current Ipd at the time TB, i.e. the reflected light-pulse 72 starts to influence the photosensitive element 27 at the time TA and stops at the time TB. The current Ipd is integrated during the first and the second time slots TS1, TS2 that results respectively to a third and a fourth amount of electrical charges Q3, Q4.

The distance d to the object 24 can be calculated by using Eq. 7 where c stands for the velocity of light in the medium through which it propagates:

$$d = \tfrac{1}{2} * c * \Delta T1 * (Q3/(Q3+Q4)).$$ Eq. 7.

In order to implement this with the apparatus of FIG. 3, the first capacitor 21 is connected with the photosensitive element 27 only from time TA until time T1 such that it charges by the current Ipd. The charge of the first capacitor 21 results in the third amount of electrical charge Q3 stored on it. The second capacitor 23 is connected with the photosensitive element 27 only from time T1 until time TB such that it charges by the current Ipd. The charge of the second capacitor 23 results in the second amount of electrical charge Q2 stored on it. From the controller 68 perspective, the third and the fourth amounts of electrical charges Q3, Q4 can be acquired through the terminals of the first capacitor 21 and the second capacitor 23, in such a case the terminals constitute a third and a fourth integrator's output voltages value V3, V4, those voltages output being simply dependent on the value of the first capacitor 21 and the second capacitor 23. Considering that the first capacitor 21 and the second capacitor 23 have a same value, the distance d to the object 24 can be calculated by the controller 28 using Eq. 8 where c stands for the velocity of light in the medium through which it propagates:

$$d = \tfrac{1}{2} * c * \Delta T1 * (V3/(V3+V4))$$ Eq. 8.

This alternative option, where for instance the second threshold voltage THL2 is set at threshold-value greater than the amplitude of another current of the light sensor 26 induced by the ambient light, provides the advantage of refining the estimation of the distance d of the object 24 as the third integrator's output voltage V3 and the fourth integrator's output voltage V4 do not include part of the amount of charges that could have been accumulated by the first capacitor 21 and the second capacitor 23 charged by the other current of the light sensor 26 induced by the ambient light.

I claim:

1. A method for determining the distance (d) from a distance-measuring-device (50) to an object (24), said method comprising:
   a) sending a light-pulse (62) from a light-emitting component (60) to the object (24) by passing a current (I1) through the light-emitting component (60);
   b) measuring a value indicative of the current (I1) through the light-emitting component (60) or a voltage (V1) across the light-emitting component (60), determining a reference-time T0 when the value exceeds a pre-determined first threshold-value THL1, and determining a first-time T1 when the value is reduced to a pre-determined second threshold-value THL2;
   c) using the time first-time T1 to define an end point and a start point of two adjacent time-slots;
   d) receiving a reflected light-pulse (72) from said object (24) at said distance-measuring-device (50) by a light sensor (26);
   e) integrating a measure of the intensity of reflected light-pulse (72) in said light sensor (26) during the two time-slots to provide two values (Q1/Q3 and Q2/Q4); and
   f) determining a time of flight from the two values of step e), a difference in time between T0 and T1 (T1−T0), and the speed of light, c.

2. The method in accordance with claim 1, wherein said measure of the intensity of reflected light-pulse (72) is a current (Ipd) through the light sensor (26).

3. The method in accordance with claim 1, wherein the value of (T1−T0) is determined by charging a first capacitor (73) of value C1 by a constant current Ic between times T0 and T1 to a voltage value VC1 and where T1−T0=(VC1*C1)/Ic.

4. The method in accordance with claim 1, wherein the thresholds THL1 and THL2 are equal.

5. A method for determining the distance (d) from a distance-measuring-device (50) to an object (24), said method comprising:
   a) sending a light-pulse (62) from a light-emitting component (60) to said object (24) by means of passing a current pulse (I1) sent through said light-emitting component (60);
   b) measuring a value indicative of the current (I1) through or a voltage (V1) across said light-emitting component (60), determining the reference-time T0 when the value exceeds a pre-determined first threshold-value THL1, and determining the first-time T1 when the value is reduced to a pre-determined second threshold-value THL2;
   c) receiving a reflected light-pulse (72) from said object (24) at said distance-measuring-device (50) by a light sensor (26);
   d) integrating a measure of the intensity of the reflected light-pulse (72) in said light sensor (26) between time T0 and T1 to provide a value Q1;
   e) integrating a measure of the intensity of a reflected light-pulse (72) in said light sensor (26) between time T1 and T2, where T2 is the time-interval equal to T0−F(2*(T1−T0)) to provide a value Q2; and
   f) determining the distance (d) from the formula d=½*c* (T1−T0)*(Q1/(Q1+Q2)).

6. The method in accordance with claim 5, wherein said measure of the intensity of the reflected light-pulse (72) is current (Ipd) through the light sensor (26).

7. The method in accordance with claim 5, wherein the value of (T1−T0) is determined by charging a first capacitor (73) of value C1 by a constant current Ic between times T0 and T1 to a voltage value VC1 and where T1−T0= (VC1*C1)/Ic.

8. The method in accordance with claim 5, wherein the thresholds THL1 and THL2 are equal.

9. A method for determining the distance (d) from a distance-measuring-device (50) to an object (24), said method comprising:
   a) sending a light-pulse (62) from a light-emitting component (60) to said object (24) by means of passing (70) a current pulse (I1) sent through said light-emitting component (60);
   b) measuring a value indicative of the current (I1) through or a voltage (V1) across said light-emitting component (60), determining the reference-time T0 when the value exceeds a pre-determined first threshold-value THL1, and determining the first-time T1 when the value is reduced to a pre-determined second threshold-value THL2;
   c) receiving a reflected light-pulse (72) from said object (24) at said distance-measuring-device (50) by a light sensor (26);
   d) measuring the current (Ipd) through or voltage across said light sensor (26), determining the point TA when the value exceeds a pre-determined third threshold-value THL3, and determining the point TB when the value is reduced to a pre-determined fourth threshold-value THL4;
   e) integrating a measure of the intensity of a reflected light-pulse (72) in said light sensor (26) between time TA and T1 to provide a value Q3;
   f) integrating a measure of the intensity of a reflected light-pulse (72) in said light sensor (26) between time T1 and TB to provide a value Q4;
   g) determining the distance (d) from the formula d=½*c* (T1−T0)*(Q3/(Q3+Q4)).

10. The method in accordance with claim 9, wherein said measure of the intensity of the reflected light-pulse (72) is current (Ipd) through the light sensor (26).

11. The method in accordance with claim 9, wherein the value of (T1−T0) is determined by charging a first capacitor (73) of value C1 by a constant current Ic between times T0 and T1 to a voltage value VC1 and where T1−T0= (VC1*C1)/Ic.

12. The method in accordance with claim 9, wherein the thresholds THL1 and THL2 are equal.

13. An apparatus for determining the distance (d) from a distance-measuring-device (50) to an object (24) comprising:
   a) means to send a light-pulse (62) from a light-emitting component (60) to said object (24) by passing a current pulse (I1) through said light-emitting component (60);
   b) means to measure the current (I1) through or voltage (V1) across said light-emitting component (60), determine a reference-time T0 when the value exceeds a pre-determined first threshold-value THL1, and determine a first-time T1 when the value is reduced to a pre-determined second threshold-value THL2;
   c) means to using the time first-time T1 to define two time-windows;
   d) means to receive a reflected light-pulse (72) from said object (24) at said distance-measuring-device (50) by a light sensor (26);
   e) means to integrate a measure of an intensity of the reflected light-pulse (72) in said light sensor (26) during the two time-windows to provide two values (Q1/Q3 and Q2/Q4); and
   f) means to determine a time of flight from the two values (Q1/Q3 and Q2/Q4), a difference between T0 and T1 (T1−T0), and the speed of light, c.

14. The apparatus in accordance with claim 13, wherein the thresholds THL1 and THL2 are equal.

15. The apparatus in accordance with claim 13, wherein said means of measuring the intensity of the reflected light-pulse (72) comprises means to measure current (Ipd) through the light sensor (26).

16. The apparatus in accordance with claim 13, wherein the means of determining the value of (T1−T0) comprises a first capacitor of value C1 charged by a constant current Ic between times T0 and T1 to a voltage value VC1 such that T1−T0=(VC1*C1)/Ic.

17. The apparatus in accordance with claim 13, wherein the means for determining the reference-time T0 and for determining the first-time T1 comprises a voltage comparator (80) having an adjustable threshold voltage input.

18. An apparatus for determining the distance (d) from a distance-measuring-device (50) to an object (24) comprising:
   a) means for sending (84) a light-pulse (62) from a light-emitting component (60) to said object (24) by means of passing (70) a current pulse (I1) sent through said component;
   b) means for measuring (80) a value indicative of the current (I1) through or a voltage (V1) across said light-emitting component (60);
   c) means for determining (80) a reference-time T0 when the values exceeds a pre-determined first threshold-value THL1 and means for determining (80) the first-time T1 when the value is reduced to a pre-determined second threshold-value THL2;
   d) means for determining the point T2 where T2 is the time-interval equal to T0−F(2*(T1−T0));
   e) light sensor means (26) for receiving a reflected light-pulse (72);
   f) means for integrating a measure of the intensity of the reflected light-pulse (72) in said light sensor (26) between time T0 and T1 to provide a value Q1 and for integrating a measure of the intensity of the reflected light-pulse (72) in said light sensor (26) between time T1 and T2, where T2 is the time-interval equal to T0+(2*(T1−T0)), to provide a value Q2;
   g) means for determining the distance (d) from the formula d=½ *c*(T1−T0)*(Q1/(Q1+Q2)).

19. The apparatus in accordance with claim 18, wherein the thresholds THL1 and THL2 are equal.

20. The apparatus in accordance with claim 18, wherein said means of measuring the intensity of the reflected light-pulse (72) comprises means to measure current (Ipd) through the light sensor (26).

21. The apparatus in accordance with claim 18, wherein the means of determining the value of (T1−T0) comprises a first capacitor of value C1 charged by a constant current Ic between times T0 and T1 to a voltage value VC1 such that T1−T0=(VC1*C1)/Ic.

22. The apparatus in accordance with claim 18, wherein the means for determining the reference-time T0 and for determining the first-time T1 comprises a voltage comparator (80) having an adjustable threshold voltage input.

23. An apparatus for determining the distance (d) from a distance-measuring-device (50) to an object (24) comprising:
- a) means for sending (84) a light-pulse (62) from a light-emitting component (60) to said object (24) by means of passing (70) a current pulse (I1) sent through said light-emitting component (60);
- b) means for measuring a value indicative of the current (I1) through or voltage (V1) across said light-emitting component (60);
- c) determining (80) a reference-time T0 when the value exceeds a pre-determined first threshold-value THL1 and means for determining (80) a first-time T1 when the value is reduced to a pre-determined second threshold-value THL2;
- d) light sensor means (26) for receiving the reflected pulse of light from said object;
- e) means for measuring the current (Ipd) through or voltage across said light sensor means (26), means for determining (82) the point TA when the values of said current (Ipd) through the light sensor exceeds a pre-determined third threshold-value THL3, and means for determining the point TB when the values of said current is reduced to a pre-determined fourth threshold-value THL4;
- f) means for integrating a measure of the intensity of reflected light in said light sensor between time TA and T1 to provide a value Q3 and means for integrating a measure of the intensity of reflected light in said light sensor between time T1 and TB; and
- g) means for determining the distance from the formula $d = \frac{1}{2} \cdot c \cdot (T1-T0) \cdot (Q3/(Q3+Q4))$.

24. The apparatus in accordance with claim 23, wherein the thresholds THL1 and THL2 are equal.

25. The apparatus in accordance with claim 23, wherein said means of measuring the intensity of the reflected light-pulse (72) comprises means to measure current (Ipd) through the light sensor (26).

26. The apparatus in accordance with claim 23, wherein the means of determining the value of (T1−T0) comprises a first capacitor of value C1 charged by a constant current Ic between times T0 and T1 to a voltage value VC1 such that $T1-T0 = (VC1 \cdot C1)/Ic$.

27. The apparatus in accordance with claim 23, wherein the means for determining the reference-time T0 and for determining the first-time T1 comprises a voltage comparator (80) having an adjustable threshold voltage input.

* * * * *